United States Patent
Aichinger et al.

(10) Patent No.: US 9,139,884 B2
(45) Date of Patent: Sep. 22, 2015

(54) PROCESS AND APPARATUS FOR PRODUCING LIQUID PIG IRON OR LIQUID PRIMARY STEEL PRODUCTS

(75) Inventors: Georg Aichinger, Asten (AT); Thomas Eder, Traun (AT); Hado Heckmann, Linz (AT); Robert Millner, Loosdorf (AT); Johannes Leopold Schenk, Linz (AT); Martin Schmidt, Leonding (AT); Kurt Wieder, Schwertberg (AT); Johann Wurm, Bad Zell (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 696 days.

(21) Appl. No.: 12/922,753

(22) PCT Filed: Jan. 30, 2009

(86) PCT No.: PCT/EP2009/051058
§ 371 (c)(1),
(2), (4) Date: Oct. 1, 2010

(87) PCT Pub. No.: WO2009/115365
PCT Pub. Date: Sep. 24, 2009

(65) Prior Publication Data
US 2011/0030507 A1    Feb. 10, 2011

(30) Foreign Application Priority Data

Mar. 17, 2008  (AT) ................... A 423/2008

(51) Int. Cl.
*C21B 15/00*    (2006.01)
*C21B 13/14*    (2006.01)
(Continued)

(52) U.S. Cl.
CPC ............... *C21B 13/14* (2013.01); *C21B 13/002* (2013.01); *F27D 17/008* (2013.01)

(58) Field of Classification Search
CPC ........ C21B 13/002; C21B 13/14; C21C 5/28; C21C 5/56

USPC ............................. 75/503, 505, 506
See application file for complete search history.

(56) References Cited

U.S. PATENT DOCUMENTS 4,509,177 A * 4/1985 Fey .................................. 373/60
5,162,107 A * 11/1992 Hirsch et al. .................. 423/623
(Continued)

FOREIGN PATENT DOCUMENTS

AT    406964 B    11/2000
AT    411 690 B    4/2004
(Continued)

OTHER PUBLICATIONS

International Search Report dated Jun. 26, 2009, issued in corresponding international application No. PCT/EP2009/051058.
(Continued)

*Primary Examiner* — Kaj K Olsen
*Assistant Examiner* — Alexander Polyansky
(74) *Attorney, Agent, or Firm* — Ostrolenk Faber LLP

(57) ABSTRACT

A process and an apparatus for producing liquid pig iron or liquid primary steel products from charge materials formed by iron ores and additions. The charge materials are subjected to a further reduction in a reducing zone (1) and are then fed to a smelting zone or a smelting unit (2), in particular a fusion gasifier, for smelting with the addition of carbon carriers and oxygen-containing gas to form a fixed bed. A CO- and $H_2$-containing reduction gas is formed, which gas is introduced into the reducing zone converted there and drawn off as top gas. The hot top gas, laden with solid matter, after separation of the solids, is subjected at least to a dry coarse separation and at least parts of the hot solids segregated by the separation are returned into the smelting zone or the smelting unit (2) or the reducing unit (1). In addition, the top gas is treated in a further fine separation stage (13A).

16 Claims, 1 Drawing Sheet

(51) Int. Cl.
*C21B 13/00* (2006.01)
*F27D 17/00* (2006.01)
*C21B 7/22* (2006.01)
*C21C 5/38* (2006.01)

(56) References Cited

U.S. PATENT DOCUMENTS

| | | | |
|---|---|---|---|
| 5,407,179 A | 4/1995 | Whipp | |
| 5,669,955 A | 9/1997 | Vuletic et al. | 75/381 |
| 6,171,365 B1 | 1/2001 | Schrey et al. | 75/492 |
| 6,277,324 B1 * | 8/2001 | Joo et al. | 266/142 |
| 2010/0126310 A1 * | 5/2010 | Hoffman | 75/10.67 |

FOREIGN PATENT DOCUMENTS

| | | |
|---|---|---|
| CN | 1212729 A | 3/1999 |
| DE | 42 40 197 A1 | 6/1994 |
| JP | 04-191307 | 7/1992 |
| JP | 04-325613 | 11/1992 |
| JP | 05-078722 A | 3/1993 |
| JP | 10-238957 | 9/1998 |
| JP | 2002-506123 | 2/2002 |
| KR | 10-0169783 | 1/1999 |
| RU | 2118374 | 8/1998 |
| WO | WO 97/33004 | 9/1997 |
| WO | WO 2005/054520 | 6/2005 |
| ZA | 9901939 A | 9/1999 |

OTHER PUBLICATIONS

Office Action dated Aug. 30, 2012 issued in corresponding Chinese Patent Application No. 200980117946.3 with English translation (21 pages).

Kurunow, I.F., et al. "State and Prospects of Direct Reduction of Iron," Central Research Institute of Information and Technical and Economic Research in Ferrous Metallurgy, Moscow 2002, pp. 117-120.

Russian Office Action and English Translation, Federal Service on Intellectual Property dated Feb. 1, 2013.

Korean Office Action mailed Dec. 29, 2014 in corresponding Korean Patent Application No. 10-2010-7023179.

* cited by examiner

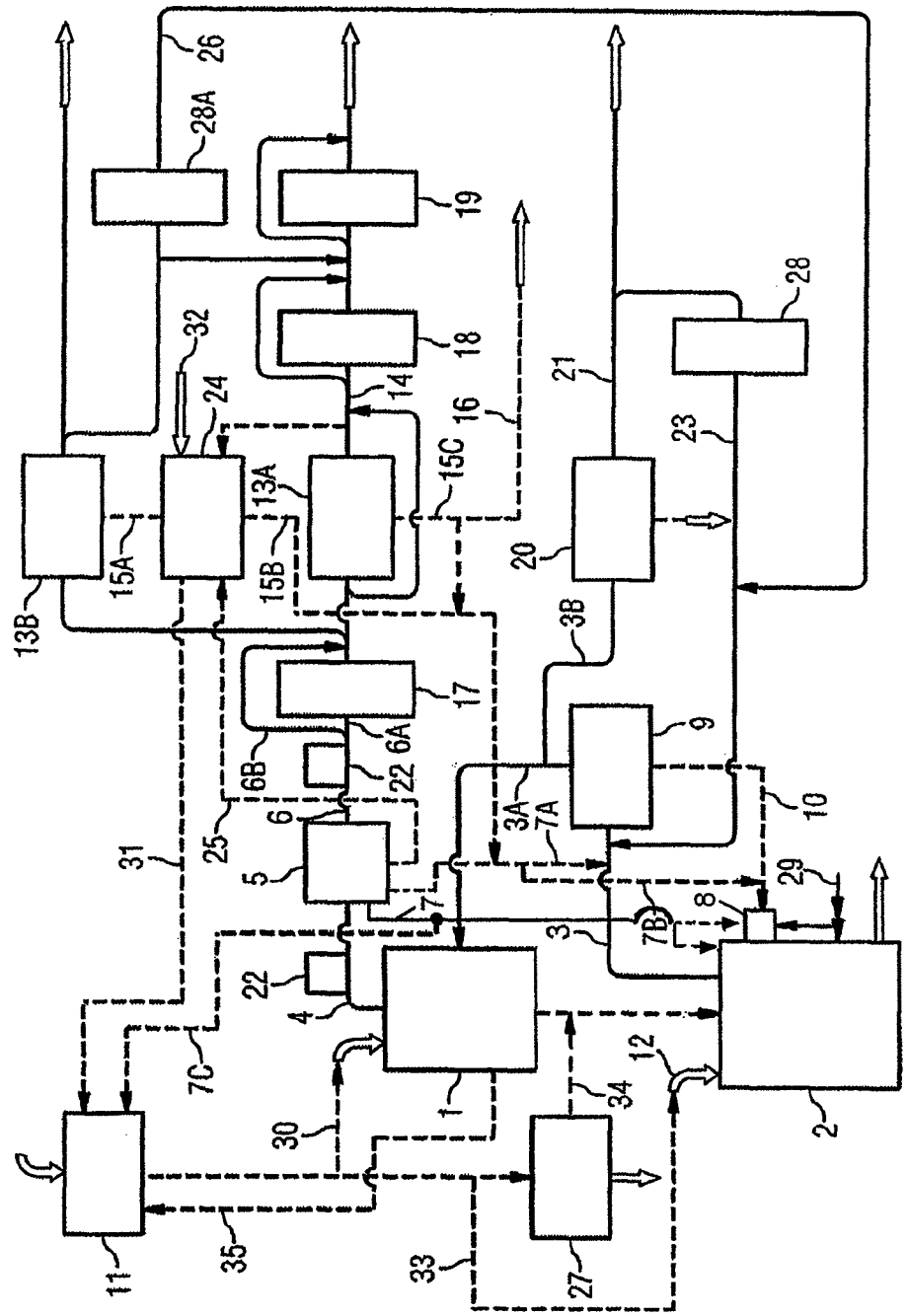

PROCESS AND APPARATUS FOR PRODUCING LIQUID PIG IRON OR LIQUID PRIMARY STEEL PRODUCTS

CROSS-REFERENCE TO RELATED APPLICATIONS

The present application is a 35 U.S.C. §§371 national phase conversion of PCT/EP2009/051058, filed Jan. 30, 2009, which claims priority of Austrian Application No. A423/2008, filed Mar. 17, 2008, the contents of which are incorporated by reference herein. The PCT International Application was published in the German language.

BACKGROUND OF THE INVENTION

The invention relates to a process and an apparatus for producing liquid pig iron or liquid primary steel products from charge materials formed by iron ores and additions. The charge materials are subjected to a further reduction in a reducing zone. The materials are then fed to a smelting zone or a smelting unit, in particular a fusion gasifier, for smelting with the addition of carbon carriers and oxygen-containing gas to form a fixed bed. A CO- and $H_2$-containing reduction gas is formed, that gas is introduced into the reducing zone, is converted there and is drawn off as top gas. The hot top gas, laden with solid matter, is subjected at least to a dry dust separation, in particular a coarse separation, with at least partial separation of the solids from the top gas. At least parts of the separated hot solids are returned into the smelting zone or the smelting unit or into a reducing zone.

It is known from the prior art on the one hand that process gases are used in various process stages or in combined processes but on the other hand that drawn-off process gases have to be treated to allow them to be passed on for further use. For this purpose, known processes often use cleaning processes for the drawn-off process gases, wherein the gases have to be cooled, with the result that considerable energy has to be removed and heat content is lost.

JP 05-078722A describes a smelting reduction process in which the top gas has the dust removed when hot, and the dust is introduced together with pre-reduced material into the smelting unit. A particularly disadvantageous aspect of this is that hot-gas cyclones only achieve inadequate dedusting.

It is known from AT 406964 B to use the waste heat of top gas from a reducing unit, preceded by hot-gas filtering. No solution is given to the problem of reusing the dusts.

It is similarly known from WO 2005/054520 to clean top gas by means of a scrubber and to pass the top gas on for renewed use. A disadvantageous aspect of this is the large amount of slurries produced.

SUMMARY OF THE INVENTION

It is therefore an object of the invention to provide a process and an apparatus, wherein drawn-off process gases are used more efficiently, and consequently the overall efficiency of the process can be increased.

The object according to the invention is achieved in respect of the process and in respect of the apparatus according to the invention.

The process according to the invention provides the treatment of a top gas laden with solid matter that is drawn from a reducing zone, wherein solid matter is separated by a dry coarse separation and returned again to the process. The separated solid matter is returned into a smelting zone, for example in a smelting unit, or into a reducing zone. In an additional fine separation stage, the top gas is cleaned again, wherein the solids separated in the fine separation stage can be returned into the fusion gasifier and/or into the smelting zone or discharged from the process.

The smelting zone and the reducing zone may also be formed as part of a blast furnace.

On account of the dry separation, no slurries occur, with the result that no treatment equipment for such slurries is necessary either. Furthermore, the thermal energy of the top gas laden with solid matter is reduced only slightly, with the result that this top gas or its thermal energy is available for further use. The coarse separation makes it possible to achieve extensive segregation of the solids from the top gas, with the result that only small amounts of solid matter remain in the top gas. The return into the smelting unit allows valuable substances contained in the solid matter, such as for example iron and/or carbon compounds, to be used.

After the dry coarse separation, the top gas is subjected at least to an additional fine separation stage, with at least partial separation of the solids remaining in the top gas, wherein the solid matter separated in this separation stage is returned into the fusion gasifier or the smelting zone or discharged from the process. A further separation stage on the one hand allows the top gas to be cleaned further, and consequently largely freed of solids, on the other hand the solid matter thereby segregated can be treated or used independently of the solid matter segregated in the first stage. This makes fractionating of the solids possible, and consequently makes separate use of these separated solids possible.

According to the invention, before the input into the fusion gasifier or the smelting zone, in particular in the case where it contains high proportions of slag-forming constituents, the separated solid matter has iron and/or carbon carriers, in particular iron- or carbon-containing dusts, dried slurries or fine ore, added to it, to be precise such that the solid matter together with the additions has an iron and carbon content of >30%, in particular >50%. Solids in the top gas may contain varying proportions of valuable substances, such as iron and/or carbon carriers and slag-forming constituents, such as for example oxides. In the case where the solid matter contains very high amounts of slag-forming constituents, return into the smelting unit could lead to a worsening of the situation in the smelt, in particular to an undesired enrichment of slag-forming elements. To avoid such a situation, only solid matter with a minimum iron and carbon content is added. To achieve these minimum contents, for certain processes it may be necessary to add iron and/or carbon carriers to the separated solid matter and introduce them together into the smelting unit. According to the invention, additional metallurgical remains, such as dusts or slurries or else fine ores, may be used in this respect.

According to a further preferred embodiment of the process according to the invention, the discharged solid matter is initially treated to enrich the iron and carbon contents, in particular by means of dust classification, hydrocycloning, flotation and/or washing out of water-soluble or readily suspensible components, and then introduced into the smelting unit or into the smelting zone. The type of enrichment may be adapted to correspond to the resources available or else to the plants, wherein the type of treatment can be correspondingly chosen from the known technical processes.

A possible refinement of the process according to the invention provides that the input of the separated solid matter, with preference by means of an agglomeration burner, takes place into the upper part of the smelting unit, in particular directly above the fixed bed. This makes it possible for the solid matter to be converted immediately in the smelting unit in the region over the fixed bed, wherein rapid gasification and combustion take place and the hot gas comes into contact with the surface of the fixed bed, with part of its heat content being transferred to the fixed bed. On account of the great heat, the dust radiation contributes very considerably to the heat transfer. Moreover, the heat content of the dust agglomerated in the burner jet that is deposited on the surface of the fixed bed is introduced into the fixed bed—along with its substantial matter. An agglomeration burner is understood by a person skilled in the art as meaning a device in which heat is generated by combustion of, for example, carbon carriers. Dust is transported with the aid of a propellant gas, such as for example nitrogen, in a propellant gas stream and introduced into the region of the heat, wherein non-combustible fractions of the dust are softened, with the result that the particles of the dust agglomerate, and agglomerates are introduced into the smelting unit.

According to the invention, particles of solid matter are segregated from the reducing gas before the latter is introduced into the reducing zone and said particles are introduced together with the solid matter separated from the top gas into the smelting unit. Solids in the process gases are usually disadvantageous, with the result that the gases are initially freed of the solids. The reducing gas produced in the smelting unit is fed to the reducing zone, this reducing gas usually being laden with solids when it leaves the smelting unit. To deal with this, a separating device is usually provided, ensuring segregation of the solid matter before the gas is introduced into the reducing zone, with the result that the reducing zone is not burdened with the solids, which predominantly consist of dusts and small particles. The solids segregated in this separation device are returned into the smelting unit. Solids that have been separated from the top gas can then be returned together with the solids separated from the reducing gas into the smelting unit. The solids may be brought together before and after the separating device for the reducing gas.

A further particular refinement of the process according to the invention provides that the separated solid matter, possibly with the admixture of fine ores and/or iron carriers and/or carbon carriers, is fed to an agglomeration device or burner and is introduced into the smelting unit as an agglomerate, possibly together with carbon carriers and/or with iron carriers. The agglomeration of the separated solids has the effect not only that they are easier to handle but also that it is possible for the composition to be specifically influenced, by the admixture mentioned, and for instance thereby improve the energy balance or the process efficiency of the smelting process or else influence the smelting process by way of the admixtures. The iron and carbon carriers mentioned can also be used in this respect.

According to an advantageous refinement of the process according to the invention, the additional fine separation stage has one or more dry dedusting stages, in particular dust filters, cyclones or dust bags. The additional separation stage has the effect that the solid matter remaining in the top gas after the coarse separation is separated virtually completely, with the result that a top gas with a very low solids content is achieved. A plurality of separating operations allows the separating result to be correspondingly improved. Known devices, such as for example dust filters, cyclones or dust bags, may be used for this, to achieve the desired separation. The devices are designed to meet the requirements for the purity of the top gas and the number of devices is correspondingly decided.

According to the invention, the additional fine separation stage has one or more wet dedusting stages, in particular scrubbers. It has been found that in some cases it is advantageous if the cleaning takes place by wet dedusting, because this causes cooling of the treated gas, and the cleaned top gas is required for further use at a lower temperature. The number of scrubbers is decided in accordance with the required cleaning and the amount of top gas that has to be cleaned. Depending on the further use of the cleaned top gas, it may be appropriate to use wet dedusting, also because of the necessity for filter-passing substances to be removed.

An advantageous refinement of the process according to the invention provides that the cleaned top gas is passed on to an expansion turbine to make use of its compressive energy. This allows the overall energy balance of the process to be improved, since the thermal energy and the compressive energy of the top gas can be used.

According to a further advantageous refinement of the process according to the invention, the top gas is cooled before and/or after the dry separation by means of injecting water, steam or cooling gas, wherein the volume of the gas is increased, with at least partial evaporation of the water. One situation where cooling of the top gas is necessary is when dealing with a very hot top gas, since the separating devices cannot permanently withstand very high thermal loading or this would mean that these devices would have to be fitted out very expensively. The evaporation causes additional compressive energy to be generated in the top gas and this can be used thereafter in a separate stage of the process. Cooling the top gas also has the effect of extending the use of the devices for separating solid matter, since the temperature of the gas to be treated often limits the use of separating devices.

According to an advantageous refinement of the process according to the invention, the heat content of the hot, cleaned top gas is discharged by way of a heat exchanger and this heat is used for heating process gases or inert gases, for drying and/or heating process charge materials or recirculated materials or for steam generation. This allows the efficiency of the smelting process or reduction process to be increased and production costs to be lowered.

The apparatus according to the invention for producing liquid pig iron or liquid primary steel products comprises a reducing unit, for reducing charge materials formed by iron ores and additives, and a smelting unit, in particular a fusion gasifier, for smelting the reduced charge materials with the addition of carbon carriers and oxygen-containing gas, wherein a fixed bed forms and a CO- and $H_2$-containing reducing gas is produced. The smelting unit is connected to the reducing unit by way of a reducing gas line, for introducing the reducing gas formed in the smelting unit into the reducing unit, and a drawing-off line, for drawing off the reducing gas converted in the reducing unit as solid matter. The reducing unit may be formed as a reduction shaft or as a plurality of reduction reactors or else as part of a blast furnace. The smelting unit may also be part of a blast furnace.

Furthermore, at least one device for dry dust separation, in particular coarse separation, of the solids of the top gas is provided, which device has a gas drawing-off line for removing the coarsely cleaned top gas and a feed line, which connects the device for dust separation to the smelting unit, with the result that the still hot separated solid matter can be introduced directly into the smelting unit. The dry separation does away with the large amounts of slurries that are customary with wet separation and in any event have to be sent for treatment, and consequently have to be laboriously handled. The dry dedusting allows the temperature of the top gas to be largely maintained, with the result that this heat content can be passed on for use at a later time.

The device for dry coarse separation is connected by a first gas drawing-off line or second gas drawing-off line to at least one device for fine separation of solids, wherein the latter has a further feed line, which connects the device for fine separation to the smelting unit.

According to the invention, the apparatus for the coarse separation of solids is a cyclone, a dust bag or a hot-gas filter, in particular a ceramic filter, or a group of units of these devices connected in parallel or in series. These devices have the advantage that cooling down of the top gas is avoided to the greatest extent, that there is no need for water/slurry management for gas cleaning, or it can be scaled down in view of a downstream wet dedusting stage. The devices may be connected in series and parallel. This takes place with consideration for the required degree of dust separation, the given throughput of gas and the desired fractionating of the dust.

According to an advantageous refinement of the apparatus according to the invention, an agglomeration burner is provided on the smelting unit for the input of the separated solids into the smelting unit, with the feed line being connected to the agglomeration burner. The agglomeration burner is used to carry out combustion of the carbon contained in the dust with oxygen. The reaction causes the carbon to gasify. In this case, at least part of the heat of the reaction gas and the remaining dust is transferred to the fixed bed.

According to a further advantageous refinement of the apparatus according to the invention, before it enters the reducing unit, the reducing gas line has a separating device for separating solids from the reducing gas and a device for returning these solids into the smelting unit, wherein the feed line enters the reducing gas line or the return device upstream of the separating device. The separating device allows the reducing gas to be cleaned before it is introduced into the reducing unit and the solids thereby separated can be returned into the smelting unit. This return takes place together with the solid matter separated from the top gas, wherein the solid matter from the top gas is introduced into the smelting unit by way of the feed line of the separating device in the reducing gas line or by way of the return device. Consequently, the segregated solids can be returned into the smelting unit by way of a common device.

According to a possible refinement of the apparatus according to the invention, the device for coarse separation of the solids is connected by way of a feed line to an agglomeration device, for the agglomeration of the solids. This allows a treatment of the segregated solids, whereby the solids can be more easily transported and returned into the smelting unit. Furthermore, the agglomerates may also be buffer-stored and passed on for later use in another process or in the same process.

According to the invention, the smelting unit has an input device for the input of carbon carriers, which is also suitable for the input of agglomerates. This input device allows solids of different particle shapes and sizes to be used, with the result that there is greater flexibility in the use of the input device. This obviates the need for any further input device other than the input device for the carbon carriers. Furthermore, it is conceivable for separated solids in the form of particles or dusts to be introduced together with the carbon carriers. The gas drawing-off line of the device for dry coarse separation may be connected indirectly by means of a second gas drawing-off line or indirectly by means of a first gas drawing-off line to at least one device for the fine separation of solids. By this connection it is possible to clean the already pre-cleaned top gas further, that is to say to reduce any dust loads that are still present by a fine separation.

According to a particular refinement of the apparatus according to the invention, the device for fine separation comprises a further gas drawing-off line for removing the finely cleaned top gas and a discharge for discharging separated solids. Consequently, a discharge is possible even in the case of very fine separated solids or when dealing with solids that cannot be used directly, with the result that the solid matter can be treated, then introduced into the smelting unit or passed on for other uses.

According to a preferred refinement of the apparatus according to the invention, the device for fine separation is a cyclone or a group of cyclones connected in parallel or in series, in particular 2 to 5 cyclones. Cyclones have the advantage that they can be operated even at high gas temperatures. Adapting the gas velocity in the cyclone makes it possible for solids to be specifically segregated, since the differences in density and size of the particles to be segregated can be used to do this. Consequently, the use of one or more cyclones allows a classification of the segregated solids to be achieved. By parallel connection, adaptation to the amount of gas to be treated is also possible. On the basis of the characteristic feature that different solids have different densities and particle sizes or shapes, it is consequently possible specifically to segregate a high proportion of fractions of the solids, such as for example undesired slag-forming constituents, by the fractionation and have them discharged from the process or passed on for some other use.

According to a further specific refinement of the apparatus according to the invention, the device for fine separation is a filter or a group of filters connected in series, in particular a cloth filter, a ceramic filter or an electrostatic filter. Such filters have the advantage that they manage without water or other auxiliaries and can therefore operate at low cost. Moreover, the top gas is only slightly cooled during the treatment.

An alternative refinement of the apparatus according to the invention provides that a further device for fine separation is provided, arranged such that it is connected in parallel with the device for fine separation. This variant makes it possible for the further device for fine separation to be additionally activated if required, or else operated instead of the device for fine separation. Consequently, this group may, if need be, be switched off, used in addition to the device for fine separation, or used exclusively for the cleaning of the pre-cleaned top gas drawn off from the device for coarse separation.

A further possible refinement of the apparatus according to the invention provides that the further device for fine separation is connected by the first gas drawing-off line or by the second gas drawing-off line or by way of a return, possibly by way of an additional cooling-gas compressor, to a drawing-off line. By way of the return, it is possible to return the top gas cleaned at the fine separation into the drawing-off line, possibly after compression, with the result that finely cleaned top gas can be used as cooling gas for setting the temperature of the reducing gas.

An alternative refinement of the apparatus according to the invention provides that the device for fine separation is a scrubber or a group of scrubbers connected in series. In the case of specific applications, it may be advantageous that the fine separation takes place by means of a scrubber. This has the advantage that a very high proportion of the solid matter is segregated. Furthermore, cooling of the top gas takes place, which may be of advantage for certain further uses.

A specific refinement of the apparatus according to the invention provides that the second gas drawing-off line for removing the cleaned top gas is connected to the device for fine separation and/or the further device for fine separation and to an expansion turbine, to make use of the compressive energy of the top gas. As a result, the compressive energy of the top gas can be directly put to use.

A specific refinement of the apparatus according to the invention provides that a means for injecting water, steam or cooling gas is provided in the drawing-off line or in the gas drawing-off line, with the result that the top gas is cooled, wherein the volume of the gas is increased, with at least partial evaporation of the water. The cooling of the top gas makes it possible to set a largely constant operating temperature for the devices for separation, even when there are operationally induced fluctuations in the temperature of the top gas. This allows high thermal loading of these devices to be avoided. The evaporation causes an additional gas volume flow to be produced in the top gas, and this can be used thereafter in a separate stage of the process. Cooling the top gas also has the effect of extending the use of the possible devices that come into consideration for being used for separating solid matter, since the temperature of the gas to be treated often limits the use of certain separating devices.

According to the invention, a heat exchanger is arranged in the first gas drawing-off line for removing the coarsely cleaned top gas and/or a heat exchanger is arranged in the further gas drawing-off line for removing the finely cleaned top gas, to make use of the heat content of the top gas for heating process gases or inert gases, for drying and/or heating process charge materials or recirculated materials or for steam generation. In this way, the heat content of the top gas can be used after coarse cleaning has taken place, or—depending on the type of fine dedusting downstream of the coarse dedusting—even after fine dusting, to heat process gases correspondingly. In the case of a temperature-sensitive device for fine dedusting, its components are subjected to less thermal loading by the top gas first passing through a heat exchanger. This allows a large number of possible devices to be used for fine separation without running the risk of thermal overloading.

An advantageous refinement of the apparatus according to the invention provides that the heat exchanger is connected to the device for fine separation and/or the further device for fine separation and to an expansion turbine, to make use of the compressive energy of the top gas. The top gas then cooled in the heat exchanger may be fed to a further device for fine separation or directly to an expansion turbine. The necessity for fine separation arises as a result of the solids remaining in the top gas after the coarse separation. In the case of low contents of solid matter after the coarse separation, it is also conceivable for the cleaned top gas to be fed directly to an expansion turbine. It is also conceivable, however, for this only to take place after the fine separation.

An alternative refinement of the apparatus according to the invention provides that the further device for fine separation has a further feed line, which connects the device for fine separation to the smelting unit, possibly by way of a treatment. This allows the deposited solid matter to be used in the smelting unit. To avoid adverse effects on the smelting unit, the solid matter may be sent to a treatment, such as for example a classifying, sorting, comminuting, mixing, dewatering and drying stage.

BRIEF DESCRIPTION OF THE DRAWING

Further advantages and features of the present invention emerge from the following description of non-restrictive exemplary embodiments, with reference being made to the accompanying figures, in which:

FIG. 1 shows a possible refinement of the apparatus according to the invention.

DETAILED DESCRIPTION OF THE PREFERRED EMBODIMENT(S)

A material pre-reduced or reduced in the reducing unit 1 is fed to a smelting unit 2, such as for example a fusion gasifier, and smelted in a fixed bed to form pig iron. The process gas thereby formed is drawn off as reducing gas by way of the reducing gas line 3. In a separating device 9, the reducing gas laden with solids is cleaned, wherein the solid matter is segregated by means of the separating device 9. The cleaned reducing gas is fed by way of the reducing gas line 3A to the reduction unit or shaft 1. In the reduction shaft 1, the charge materials are reduced by means of the CO- and $H_2$-containing reducing gas and the converted reducing gas is drawn off as top gas by way of the drawing-off line 4 and fed to a device for coarse separation 5. The hot top gas, laden with solids, is largely cleaned in the device for coarse separation 5, in that the solids are segregated.

In addition to the reducing gas line 3A, a line 3B may be provided, connecting the reducing gas line 3A to a wet dedusting device 20. The wet dedusting device 20 may be connected by way of a line 21 to a cooling-gas compressor 28, wherein the drawing-off line 23 of the cooling-gas compressor 28 is connected to the reducing gas line 3. The segregated solids from the device for coarse separation 5 are fed to the smelting unit 2 either by way of the feed line 7 and an agglomeration burner 8, which enters the smelting unit 2 over the fixed bed, or directly into the fixed bed. The agglomeration burner 8 may be connected to an oxygen supply 29 for introducing oxygen-containing gases or gas mixtures, which also supplies the smelting unit with these gases or gas mixtures.

Alternatively, the segregated solids may also be introduced by means of the feed line 7A into the reducing gas line 3 upstream of the separation device 9 or by means of the feed line 7B into the return line 10 leading downstream from the separation device 9. The return line 10 may be connected to the smelting unit 2 by the agglomeration burner 8.

The feed line 7 may be connected to an agglomeration device 11 by way of a line 7C, with the result that solids from the device for coarse separation 5 can be fed to the agglomeration device 11. Furthermore, the agglomerates formed in the agglomeration device 11 can be introduced into the smelting unit 2. The agglomeration device 11 may be designed as a coal briquetting device, as an oxide briquetting device or as a sponge iron compacting or briquetting device. The agglomerates formed may, as coal briquettes, be introduced by way of a line 33 and a charging device 12 directly into the smelting unit 2, as oxide briquettes be introduced by way of a line 30 directly into the reduction shaft 1 or, as sponge iron briquettes, initially be pretreated in a pre-heating and reducing stage 27 and then introduced by way of the line 34 into the smelting unit 2.

In a particular variant that is not represented, the material pre-reduced or reduced in a plurality of reduction reactors may be fed by way of the line 35 to the agglomeration device 11 for hot briquetting or hot compacting. The reduction reactors analogously undertake the function of the reducing unit. These agglomerates are then introduced into the smelting unit 2.

The first gas drawing-off line 6A and the second gas drawing-off line 6B of the device for coarse separation 5 may be connected directly or indirectly to a device for dry fine separation 13A and/or a further device for fine separation 13B. Alternatively, a heat exchanger 17 may be installed in the first gas drawing-off line 6A between the devices 5 and 13A, 13B. This heat exchanger can allow reduction of the temperature of the top gas, while using the thermal energy, for example, for heating process gases. Furthermore, a means 22 for injecting water, steam or cooling gas may be located so that water, steam or cooling gas may be introduced into the drawing-off line 4 or the gas drawing-off lines 6A, 6B, allowing water to be at least partly evaporated and the top gas to be cooled.

The further device for fine separation 13B may include one or more wet dedusting devices connected in parallel to each other and may be provided in parallel to the device for dry fine separation 13A. These wet dedusting devices may be operated together with the device for fine separation 13A or on their own. It is also conceivable to provide these wet dedusting devices as standby devices, which may be additionally activated only if they are required.

The devices for fine separation 13A, 13B have further feed lines 15A, 15B, 15C for returning the separated solids from these devices for fine separation. In addition, a discharge 16 may be provided to discharge separated solids that cannot be returned directly into the smelting unit. Between the feed lines 15A, 15B there may also be a treatment 24 of the solids separated in the case where the further device for fine separation 13B includes one or more wet dedusting devices, which may have a classifying, sorting, comminuting, mixing, dewatering and drying stage. The treatment 24 may also be connected to the device for coarse separation or dry dedusting device 5 by way of a feed line 25, with the result that solids separated at the dry dedusting device 5 can be fed to the treatment 24. For further agglomeration, the treatment 24 may be connected by way of a line 31 to the agglomeration device 11. Further dusts or additions can be introduced to treatment 24 by way of an input 32.

The pre-cleaned or cleaned top gas may be fed to an expansion turbine 19 to make use of the compressive energy of the top gas. Alternatively, before it is introduced into the expansion turbine 19, the top gas may be cooled in a heat exchanger 18. Instead of a heat exchanger 17, the heat exchanger 18 is placed downstream of the dry fine separation device 13A in the further gas drawing-off line 14, if the dust load of the gas upstream of the dry fine separation device 13A is too high for permanent operation of a heat exchanger. The top gas expanded after the expansion turbine 19 can be passed on for further uses.

Alternatively to discharging the cleaned top gas or feeding the cleaned top gas into the expansion gas turbine 19 from the further device for fine separation 13B or from the wet dedusting device, a return 26 may be provided, with the result that the top gas cleaned at the further device for fine separation 13B or at the wet dedusting device can be returned, possibly by way of an additional cooling-gas compressor 28A, into the drawing-off line 23.

The invention claimed is:

1. A process for producing liquid pig iron or liquid primary steel products from charge materials formed by iron ores and additions, the process comprising:
   subjecting the charge materials to a reduction in a reducing zone and then feeding the charge materials to a smelting unit for smelting along with adding carbon carriers and oxygen-containing gas to form a fixed bed and for forming a CO- and $H_2$-containing reduction gas;
   introducing the reduction gas into the reducing zone to form a converted reduction gas, then drawing the converted reduction gas off from the reducing zone as hot top gas;
   subjecting the hot top gas, laden with solid matter, to at least a dry dust separation, for at least partially separating the solid matter from the top gas, and returning at least parts of the separated solid matter into the smelting unit or into the reducing zone,
   after the dry dust separation, subjecting the top gas at least to an additional fine separation stage for at least partially separating the solid matter remaining in the top gas, and returning the separated solid matter, separated in the fine separation stage, into the smelting unit, the additional fine separation stage being performed by at least two devices, at least two of the at least two devices being connected in parallel to each other, the at least two devices performing the additional fine separation stage further comprising an additional separation device that can be turned on or off.

2. The process as claimed in claim 1, further comprising, before the returning of the separated solid matter into the smelting unit, and where the separated solid matter contains high proportions of slag-forming constituents, adding to the separated solid matter iron and/or carbon carriers, dried slurries or fine ore, such that the separated solid matter together with the additions has an iron and carbon content of greater than 30%.

3. The process as claimed in claim 1, further comprising initially treating the separated solid matter to enrich the iron and carbon content thereof, by means of dust classification, hydrocycloning, flotation and/or washing out of water-soluble or readily suspensible components, and then returning the separated solid matter into the smelting unit.

4. The process as claimed in claim 1, further comprising feeding of the separated solid matter into an upper part of the smelting unit, above the fixed bed.

5. The process as claimed in claim 1, further comprising segregating particles of solid matter from the reduction gas before introducing the reduction gas into the reducing zone and introducing the particles of solid matter together with the solid matter separated from the top gas into the smelting unit,
   wherein an additional separation device, other than a separation device performing the dry dust separation, segregates the particles of solid matter from the reduction gas.

6. The process as claimed in claim 1, further comprising feeding the separated solid matter to an agglomeration device or burner and then introducing an agglomerate into the smelting unit.

7. The process as claimed in claim 1, wherein the additional fine separation stage has one or more dry dedusting stages.

8. The process as claimed in claim 1, wherein the additional fine separation stage has one or more wet dedusting stages.

9. The process as claimed in claim 1, further comprising passing cleaned top gas to an expansion turbine to make use of compressive energy of the top gas.

10. The process as claimed in claim 1, further comprising cooling the top gas before and/or after the dry separation by injecting water, steam or cooling gas, wherein the volume of the gas is increased, along with at least partial evaporation of the water.

11. The process as claimed in claim 1, further comprising, discharging the heat content of the top gas, subjected to at least the dry dust separation, by a heat exchanger and using the heat for at least one of heating process gases or inert gases, drying and/or heating process charge materials or recirculated materials or steam generation.

12. The process as claimed in claim 1, wherein the smelting unit is a fusion gasifier, and the dry dust separation is a coarse separation.

13. The process as claimed in claim 4, wherein the separated solid matter is agglomerated in an agglomeration burner and is introduced into the upper part of the smelting unit.

14. The process as claimed in claim 6, wherein the solid matter is fed with an admixture of fine ores and/or iron carriers and/or carbon carriers to the agglomeration device or burner.

15. A process for producing liquid pig iron or liquid primary steel products from charge materials formed by iron ores and additions, the process comprising:

subjecting the charge materials to a reduction in a reducing zone and then feeding the charge materials to a smelting unit for smelting along with adding carbon carriers and oxygen-containing gas to form a fixed bed and for forming a CO- and $H_2$-containing reduction gas;

introducing the reduction gas into the reducing zone to form a converted reduction gas, then drawing the converted reduction gas off from the reducing zone as hot top gas;

subjecting the hot top gas, laden with solid matter, to at least a dry dust separation, for at least partially separating the solid matter from the top gas, and returning at least parts of the separated solid matter into the reducing zone and directly into the smelting unit, after the dry dust separation, subjecting the top gas at least to an additional fine separation stage for at least partially separating the solid matter remaining in the top gas, and returning the separated solid matter, separated in the fine separation stage, into the smelting unit, the additional fine separation stage being performed by at least two devices, at least two of the at least two devices being connected in parallel to each other.

16. A process for producing liquid pig iron or liquid primary steel products from charge materials formed by iron ores and additions, the process comprising:

subjecting the charge materials to a reduction in a reducing zone and then feeding the charge materials to a smelting unit for smelting along with adding carbon carriers and oxygen-containing gas to form a fixed bed and for forming a CO- and $H_2$-containing reduction gas;

introducing the reduction gas into the reducing zone to form a converted reduction gas, then drawing the converted reduction gas off from the reducing zone as hot top gas;

subjecting the hot top gas, laden with solid matter, to at least a dry dust separation, for at least partially separating the solid matter from the top gas, and returning at least parts of the separated solid matter into the smelting unit or into the reducing zone, after the dry dust separation, subjecting the top gas at least to an additional fine separation stage for at least partially separating the solid matter remaining in the top gas, and returning the separated solid matter, separated in the fine separation stage, into the smelting unit, the additional fine separation stage being performed by at least two devices, at least one of the at least two devices being connected in parallel to the at least two devices, which are different from the at least one device, such that one of the at least one device connected in parallel can be turned on or off.

* * * * *